US011634992B2

(12) United States Patent
Dhabade et al.

(10) Patent No.: US 11,634,992 B2
(45) Date of Patent: Apr. 25, 2023

(54) AIR TURBINE STARTER WITH SHAPED VANES

(71) Applicant: Unison Industries, LLC, Jacksonville, FL (US)

(72) Inventors: Milind Chandrakant Dhabade, Bangalore (IN); Vishnu Vardhan Venkata Tatiparthi, Bangalore (IN); Ramana Reddy Kollam, Bangalore (IN); Shiloh Montegomery Meyers, Dayton, OH (US); Saurya Ranjan Ray, Bangalore (IN); Subrata Nayak, Bangalore (IN)

(73) Assignee: Unison Industries, LLC, Jacksonville, FL (US)

( * ) Notice: Subject to any disclaimer, the term of this patent is extended or adjusted under 35 U.S.C. 154(b) by 0 days.

(21) Appl. No.: 17/347,974

(22) Filed: Jun. 15, 2021

(65) Prior Publication Data

US 2022/0243601 A1    Aug. 4, 2022

(30) Foreign Application Priority Data

Feb. 3, 2021    (IN) .............................. 202111004669

(51) Int. Cl.
*F01D 9/04*    (2006.01)
*F02C 7/277*    (2006.01)
*F01D 5/14*    (2006.01)

(52) U.S. Cl.
CPC ............. *F01D 9/041* (2013.01); *F01D 5/141* (2013.01); *F02C 7/277* (2013.01); *F05D 2240/121* (2013.01); *F05D 2240/122* (2013.01); *F05D 2240/125* (2013.01); *F05D 2250/322* (2013.01); *F05D 2250/38* (2013.01); *F05D 2260/85* (2013.01)

(58) Field of Classification Search
CPC .......... F01D 9/041; F01D 5/141; F02C 7/277; F05D 2240/121; F05D 2240/122; F05D 2240/125; F05D 2250/322; F05D 2250/38; F05D 2260/85
See application file for complete search history.

(56) References Cited

U.S. PATENT DOCUMENTS 5,042,963 A * 8/1991 Sorenson ................ F02C 7/268
                                                     415/18
6,318,958 B1 * 11/2001 Giesler ................... F02C 7/277
                                                     415/113
6,331,100 B1   12/2001 Liu et al.
(Continued)

FOREIGN PATENT DOCUMENTS

CN        104411982 A    3/2015
EP          1772596 A2   4/2007
(Continued)

*Primary Examiner* — Juan G Flores
*Assistant Examiner* — Brian Christopher Delrue
(74) *Attorney, Agent, or Firm* — McGarry Bair PC

(57) ABSTRACT

An air turbine starter comprising a housing defining an inlet, an outlet, and a flow path, a turbine having a rotor with circumferentially spaced blades extending into the flow path, a drive shaft operably coupled to and rotating with the rotor, and at least one vane located within the flow path, upstream of the blades. The at least one blade being defined by an acute axial angle and an acute tangential angle.

20 Claims, 9 Drawing Sheets

(56) References Cited

U.S. PATENT DOCUMENTS

| | | | | |
|---|---|---|---|---|
| 6,623,238 | B2* | 9/2003 | Langston | F01D 11/00 |
| | | | | 415/113 |
| 6,991,425 | B2* | 1/2006 | Kruegel | F02C 7/277 |
| | | | | 415/214.1 |
| 7,033,134 | B2* | 4/2006 | Bristol | F02C 7/277 |
| | | | | 415/110 |
| 7,513,102 | B2 | 4/2009 | Moniz et al. | |
| 7,743,497 | B2* | 6/2010 | Gautreau | F04D 29/666 |
| | | | | 29/402.09 |
| 8,651,806 | B2* | 2/2014 | Zawilinski | F02C 7/32 |
| | | | | 415/182.1 |
| 8,672,620 | B2* | 3/2014 | Zawilinski | F02C 7/277 |
| | | | | 416/223 R |
| 8,678,752 | B2* | 3/2014 | Delvaux | F01D 5/16 |
| | | | | 415/119 |
| 9,028,208 | B2* | 5/2015 | Zawilinski | F01D 5/143 |
| | | | | 415/191 |
| 10,767,564 | B2* | 9/2020 | Kelly | F01D 17/06 |
| 2012/0042659 | A1* | 2/2012 | Zawilinski | F01D 25/24 |
| | | | | 415/206 |
| 2012/0099995 | A1* | 4/2012 | Delvaux | F01D 5/30 |
| | | | | 29/889.21 |
| 2014/0363276 | A1 | 12/2014 | Vetters et al. | |

FOREIGN PATENT DOCUMENTS

| | | | | |
|---|---|---|---|---|
| EP | 3851655 A1 * | 7/2021 | | F01D 25/186 |
| WO | 2016068862 A1 | 5/2016 | | |

* cited by examiner

US 11,634,992 B2

AIR TURBINE STARTER WITH SHAPED VANES

CROSS REFERENCE TO RELATED APPLICATIONS

This application claims priority to Indian Provisional Application No. 202111004669, filed Feb. 3, 2021, which is incorporated herein by reference in its entirety.

TECHNICAL FIELD

The disclosure generally relates to an air turbine starter for a turbine engine, and, more specifically to an air turbine starter with shaped vanes.

BACKGROUND

A turbine engine, for example a gas turbine engine, is engaged in regular operation to an air turbine starter. Air turbine starters are typically removably coupled to the engine through a gearbox or other transmission assembly when it is desired to start the turbine engine. The transmission transfers power from the air turbine starter to the engine to assist in starting the engine. The internal components of both the turbine engine and the air turbine starter spin together such that the air turbine starter can be used to start the engine.

BRIEF DESCRIPTION

In one aspect, the disclosure relates to an air turbine starter, comprising a housing defining an inlet, an outlet, and a flow path extending between the inlet and the outlet, a turbine having a rotor with circumferentially spaced blades located within the housing, at least a portion of the blades extend into the flow path and rotate in a rotational direction in response to a fluid flowing along the flow path from the inlet to the outlet, a drive shaft operably coupled to and rotating with the rotor to define a rotational axis, and at least one vane located within the flow path, upstream of the blades, and having an outer wall defining a pressure side and a suction side extending between a leading edge and a trailing edge to define a chord-wise direction, and between a root and a tip to define a span-wise direction, wherein the at least one vane is shaped such that a line, extending between the root and the tip at the same percent of the at least one vane in the chord-wise direction, forms an acute axial angle relative to a ray extending perpendicularly from the rotational axis and intersecting the line when viewed in a plane including the line and the rotational axis, and wherein the at least one vane is further shaped such that an acute tangential angle is formed between the line and the ray extending perpendicularly from the rotational axis when viewed in a plane that is normal to the rotational axis.

In another aspect, the disclosure relates to a vane located within a flow path of an air turbine starter that includes a drive shaft defining a rotational axis, the vane comprising an outer wall defining a pressure side and a suction side extending between a leading edge and a trailing edge to define a chord-wise direction, and between a root and a tip to define a span-wise direction, wherein the vane is shaped such that a line, intersecting the root and the tip at the same percent of the vane in the chord-wise direction, forms an acute axial angle relative to a ray extending perpendicularly from the rotational axis and intersecting the line when viewed in a plane including the line and the rotational axis, and wherein the vane is further shaped such that an acute tangential angle is formed between the line and the ray extending perpendicularly from the rotational axis when viewed in a plane that is normal to the rotational axis.

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

DETAILED DESCRIPTION

Figure 1:
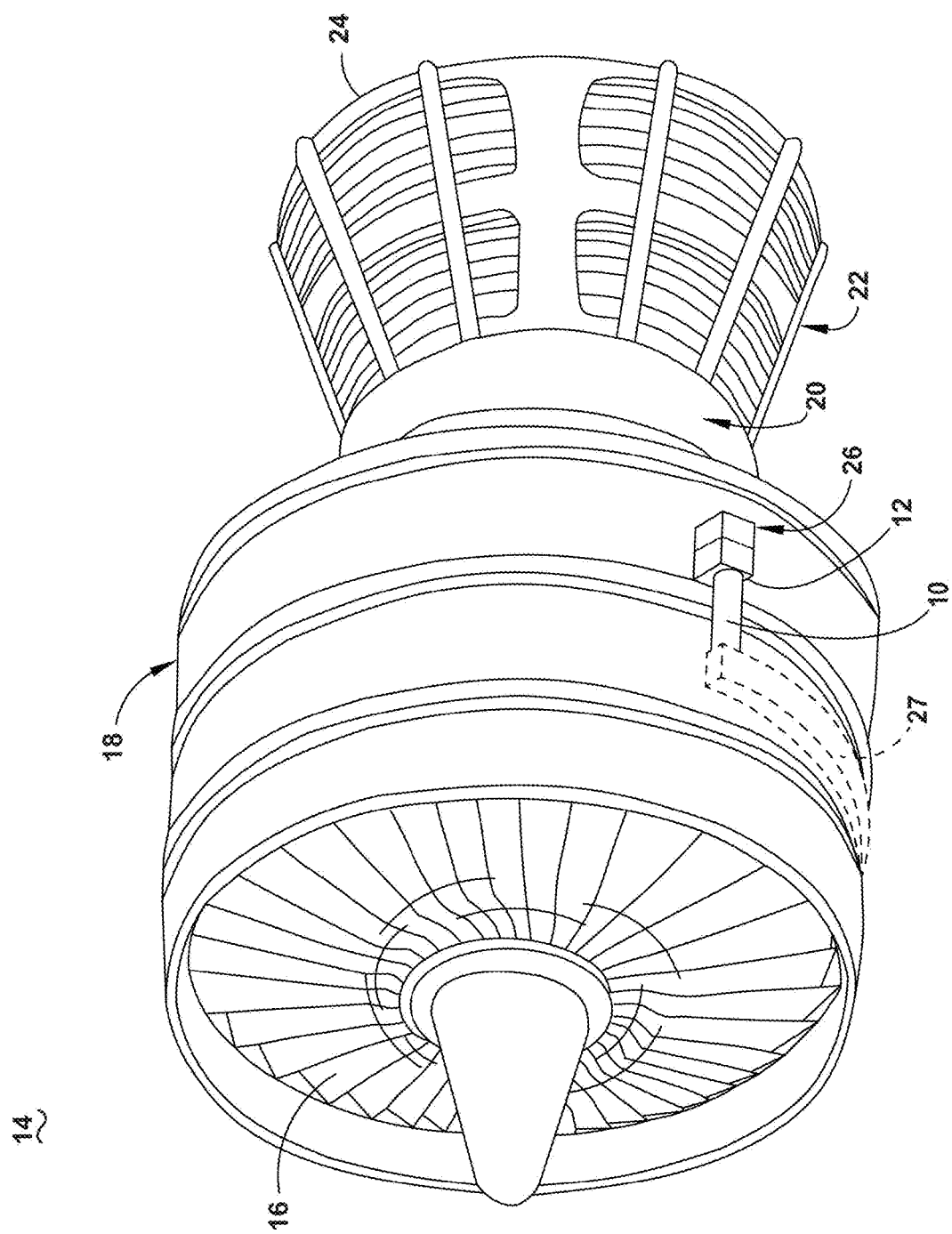
FIG. 1 is a schematic illustration of a turbine engine with an air turbine starter, in accordance with various aspects described herein.

Aspects of the disclosure described herein are directed to a turbine engine with an air turbine starter that includes a flow path extending between an inlet and an outlet, and a set of vanes provided within the flow path. The set of vanes can be positioned at a first acute angle and a second acute angle with respect to the rotational axis, while the flow path can be defined as a curved flow path. For purposes of illustration, the present disclosure will be described with respect to an air turbine starter for an aircraft turbine engine. For example, the disclosure can have applicability in other vehicles or engines, and can be used to provide benefits in industrial, commercial, and residential applications. Further non-limiting examples of other vehicles or engines to which the disclosure can relate can include boats, cars, or other aquatic or land vehicles. Industrial, commercial, or residential applications of the disclosure can include, but are not limited to, marine power plants, wind turbines, small power plants, or helicopters.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Referring to FIG. 1, a starter motor or air turbine starter 10 is coupled to an accessory gear box (AGB) 12, also known as a transmission housing, and together are schematically illustrated as being mounted to a turbine engine 14 such as a gas turbine engine. The turbine engine 14 comprises an air intake with a fan 16 that supplies air to a high pressure compression region 18. The air intake with a fan 16 and the high pressure compression region collectively are known as the 'cold section' of the turbine engine 14 upstream of the combustion. The high pressure compression region 18 provides a combustion chamber 20 with high pressure air. In the combustion chamber, the high pressure air is mixed with fuel and combusted. The hot and pressurized combusted gas passes through a high pressure turbine region 22 and a low pressure turbine region 24 before exhausting from the turbine engine 14. As the pressurized gases pass through the high pressure turbine (not shown) of the high pressure turbine region 22 and the low pressure turbine (not shown) of the low pressure turbine region 24, the turbines extract rotational energy from the flow of the gases passing through the turbine engine 14. The high pressure turbine of the high pressure turbine region 22 can be coupled to the compression mechanism (not shown) of the high pressure compression region 18 by way of a shaft to power the compression mechanism. The low pressure turbine can be coupled to the fan 16 of the air intake by way of the shaft to power the fan 16.

The turbine engine can be a turbofan engine commonly used in modern commercial or it could be a variety of other known turbine engines such as a turboprop or turboshaft.

The AGB 12 is coupled to the turbine engine 14 at either the high pressure or low pressure turbine region 22, 24 by way of a mechanical power take-off 26. The mechanical power take-off 26 contains multiple gears and means for mechanical coupling of the AGB 12 to the turbine engine 14.

Under normal operating conditions, the mechanical power take-off 26 translates power from the turbine engine 14 to the AGB 12 to power accessories of the aircraft for example but not limited to fuel pumps, electrical systems, and cabin environment controls. The air turbine starter 10 can be mounted on the outside of either the air intake region containing the fan 16 or on the core near the high pressure compression region 18. Optionally, an air intake conduit 27 can couple to the air turbine starter 10. The air intake conduit 27 can supply the air turbine starter 10 with pressurized air.

Figure 2:
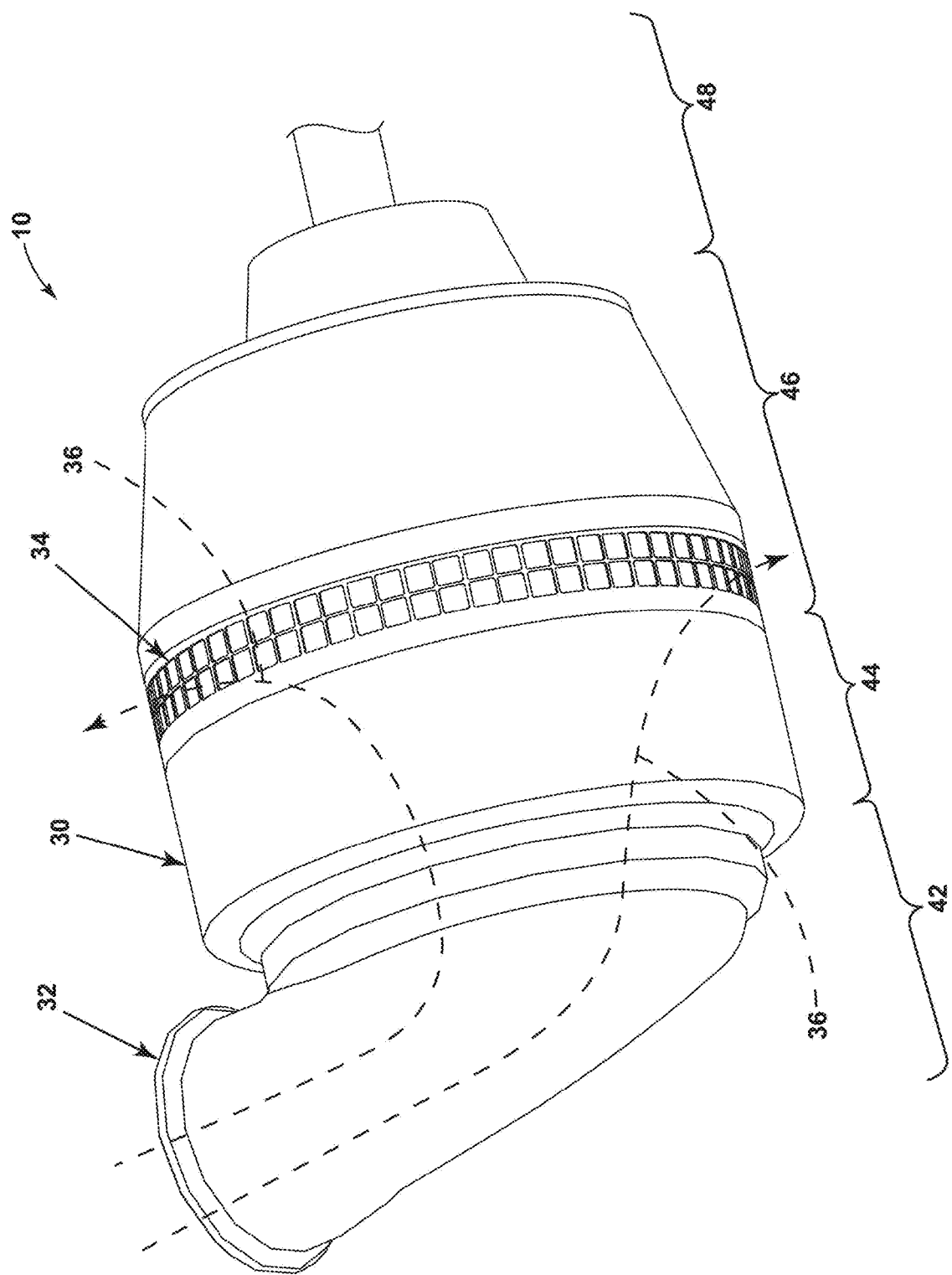
FIG. 2 further illustrates the air turbine starter of FIG. 1, in accordance with various aspects described herein.

Referring now to FIG. 2, a perspective view of exemplary air turbine starter 10 is shown in greater detail. Generally, the air turbine starter 10 includes a housing 30 defining an inlet 32 and an outlet 34. A flow path 36, illustrated schematically with arrows, extends between the inlet 32 and the outlet 34 for communicating a flow of fluid, including, but not limited to gas, compressed air, or the like, there through. In one non-limiting example, the fluid is air, such as pressurized air, that is supplied from a pressurized air source, including but not limited to, a ground-operating air cart, an auxiliary power unit, or a cross-bleed start from an engine already operating.

The housing 30 can be formed in any suitable manner including, but not limited to, that it can be made up of two or more parts that are joined or otherwise coupled together or can be integrally formed as a single piece.

In the depicted aspects of the disclosure, the housing 30 of the air turbine starter 10 generally defines, in an in-line series arrangement, an inlet assembly 42, a turbine section 44, a gear box 46, and a drive section 48. The air turbine starter 10 can be manufactured with any suitable materials and methods, including, but not limited to, additive manufacturing or die-casting of high strength and lightweight metals such as aluminum, stainless steel, iron, or titanium. The housing 30 and the gear box 46 can be formed with a thickness sufficient to provide adequate mechanical rigidity without adding unnecessary weight to the air turbine starter 10 and, therefore, the aircraft.

Figure 3:
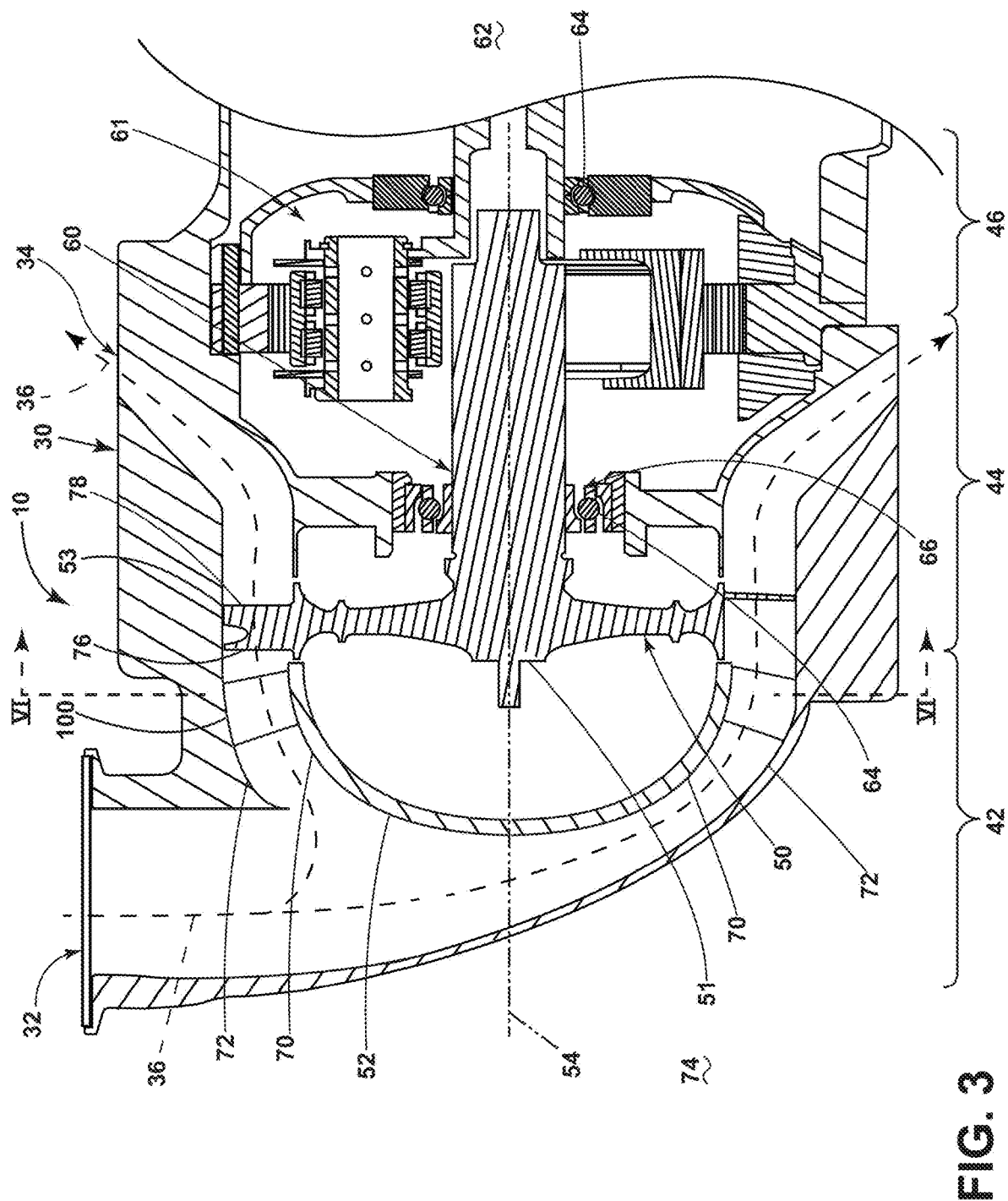
FIG. 3 is a schematic cross-sectional view of a portion of the starter of FIG. 2, further including a set of vanes located within a flow path upstream of a rotating turbine having a set of blades, and in accordance with various aspects described herein.

FIG. 3 is a schematic cross section of the air turbine starter 10 of FIG. 2 which shows the inlet assembly 42, the turbine section 44, and the gear box 46 in greater detail. The turbine section 44 can include a turbine 50 including a rotor 51 with a set of circumferentially spaced blades 53, the rotor 51 being journaled within the housing 30. The turbine 50, the rotor 51, and the set of circumferentially spaced blades 53 thereof, can rotate about a rotational axis 54. At least a portion of the turbine 50, specifically the set of circumferentially spaced blades 53, can be disposed in the flow path 36 for rotatably extracting mechanical power from the flow of gas from the inlet 32 to the outlet 34. Each blade 53 of the set of circumferentially spaced blades 53 can be defined by an airfoil shape, and extend between a leading edge 76 and a trailing edge 78, downstream the leading edge, to define a chord-wise direction of the blade.

An output shaft or drive shaft 60 operably couples to the turbine 50 and is rotationally driven thereby. The drive shaft 60 at least partially defines the rotor 51 and allows for the transfer of energy from air in the flow path 36 to rotational mechanical power. The drive shaft 60 can extend through at least a portion of the inlet assembly 42, the turbine section 44, and the gear box 46. By way of non-limiting example, the drive shaft 60 can be configured to provide a rotational output from the turbine 50 or rotor 51 to one or more gears or clutch assemblies such as a gear train 61 in the gear box 46.

At least one thrust bearing 64 can be configured to rotatably support the turbine 50 and the drive shaft 60. The at least one thrust bearing 64 can include any number of bearings, including a single thrust bearing or multiple thrust bearings. The at least one thrust bearing 64 can couple to the drive shaft 60 at a rear side 62 of the turbine 50 or the rotor 51. The at least one thrust bearing 64 can be located in a wet portion 66 of the housing 30. That is, the at least one thrust bearing 64 can be lubricated with a grease or oil in the wet portion of the housing 30. The wet portion 66 is a cavity or portion in the housing 30 that is exposed to liquid coolant, whereas a dry portion can be a cavity or portion that is not exposed to liquid coolant. By way of non-limiting example, the forward side of the turbine 50 is a dry portion of the housing 30. It will be understood that while some lubricant may be included or located within the dry portion such lubricant is not enough to fully lubricate the forward portion of the drive shaft 60.

The inlet assembly 42 can include a stator 52 to guide the air flow in the flow path 36. By way of non-limiting example, the stator 52 can define at least a portion of the flow path 36 from the inlet 32 to the set of circumferentially space blades 53. At least a portion of the flow path 36 can be defined by an inner periphery 70 and an outer periphery 72 provided radially outwardly form the inner periphery 70. The inner periphery 70 can be formed by at least a portion of the stator 52, while the outer periphery 72 can be formed by at least a portion of the housing 30.

A set of stationary components, specifically a set of vanes 100 are circumferentially spaced about and extend outwardly from the stator 52 and into the flow path 36 with respect to the rotational axis 54. The set of vanes can further be located upstream the set of circumferentially spaced blades 53. Specifically, the set of vanes 100 can extend from the inner periphery 70 of the flow path 36 toward the outer periphery 72. It will be appreciated that the set of vanes 100 can be formed integrally with the stator 52. Additionally, or alternatively, the set of vanes 100 can extend from the outer periphery 72 and be integrally formed with the outer periphery 72, or the set of vanes 100 can be integrally formed with both the inner periphery 70 and the outer periphery 72. The set of stationary components, although described in terms of the set of vanes 100, can be at least one airfoil, nozzle, vent, or any other structure used to direct or allow the flow of air.

During operation of the air turbine starter 10, pressurized air is supplied to the air turbine starter 10 through the inlet 32. The pressurized air can flow through the flow path 36, around the stator 52, and over the set of vanes 100. The pressurized air can flow over the set of vanes 100 from an upstream portion to a downstream portion and follow the contour of the vanes 100. As such, the set of vanes 100 can be sued to direct or otherwise redirect the pressurized air within the flow path 36. The pressurized air can then flow from the set of vanes 100 and over the circumferentially spaced blades 53. The flow of the pressurized air over the blades 53 can subsequently cause the rotation of the rotor 51, which can ultimately result in the rotation of the drive shaft 60. It is contemplated that the set of vanes 100 can be shaped so that the pressurized air leaving the vanes 100 at the downstream portion of the vanes 100 can impinge the blades 53 without resulting in a large amount of losses. In other words, the pressurized air leaving the vanes 100 can be non-counter to a direction of rotation of the blades 53.

Figure 4:
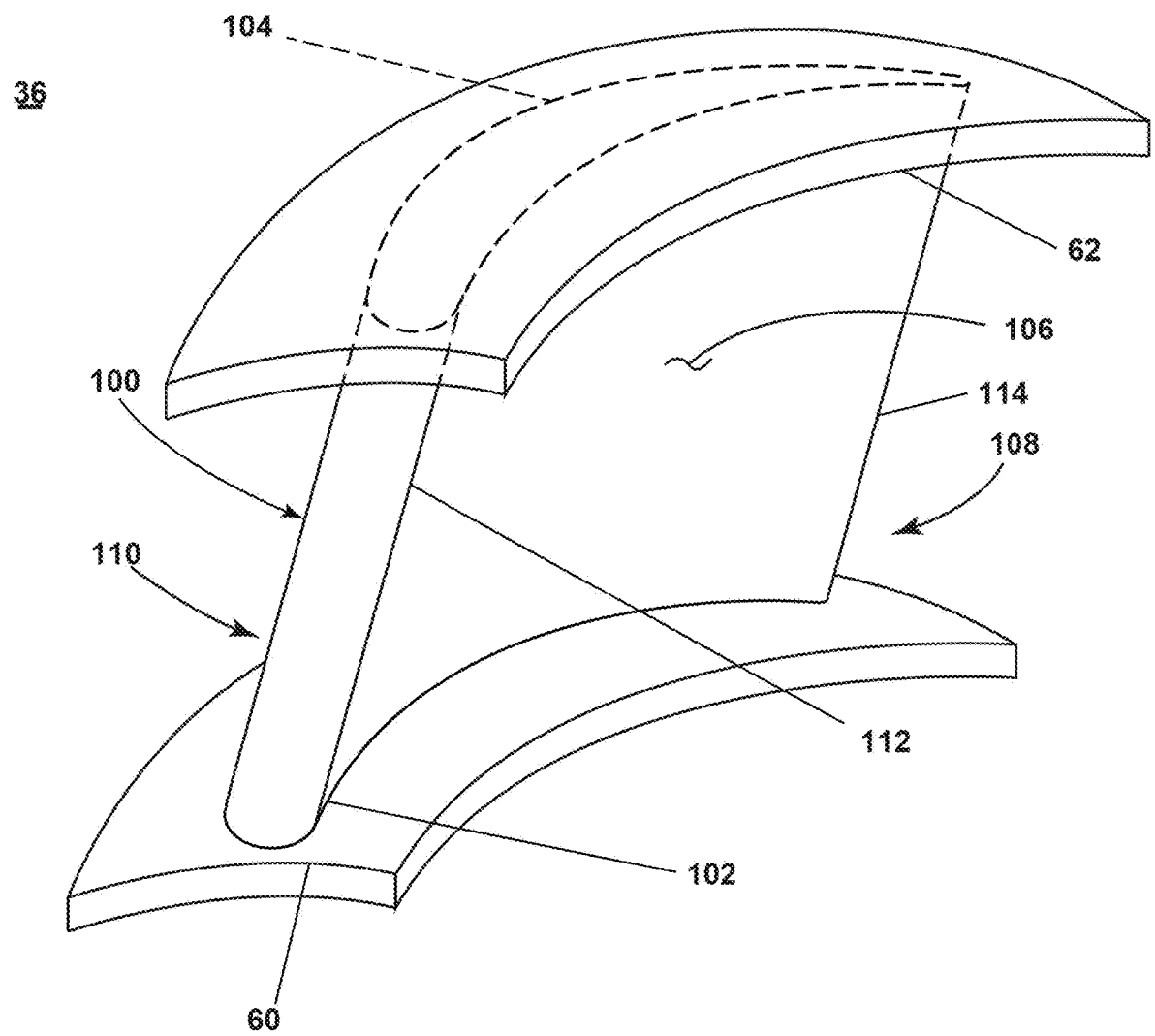
FIG. 4 is a perspective view of an exemplary vane of the set of vanes of FIG. 2, in accordance with various aspects described herein.

FIG. 4 is a perspective view of a vane 100 of the set of vanes 100 of FIG. 3. Although a single vane 100 is illustrated, it will be appreciated that aspects of the vane 100 can be applied to any vane 100 of the set of vanes 100.

The vane 100 can extend from the inner periphery 70 at a root 102 to the outer periphery 72 at a tip 104 to define a span-wise direction. The vane 100 includes an outer wall 106 defining the periphery of the vane 100, which can be functionally divided into a pressure side 108 and a suction side 110, demarcated by a leading edge 112 and a trailing edge 114. The vane 100 can extend between the leading edge 112 and the trailing edge 114 to define a chord-wise direction. As illustrated, the vane 100 can be defined by an airfoil cross section. Further, as illustrated, the vane 100 can following the contour of the inner periphery 70 and the outer periphery 72 in the chord-wise direction and further be tilted in the span wise direction toward the suction side 110 of the vane 100. In other words, the root 102 can be circumferentially displaced from the tip 104 such that the vane 100 is circumferentially or tangentially leaned toward the suction side 110 of the vane 100.

Figure 5:
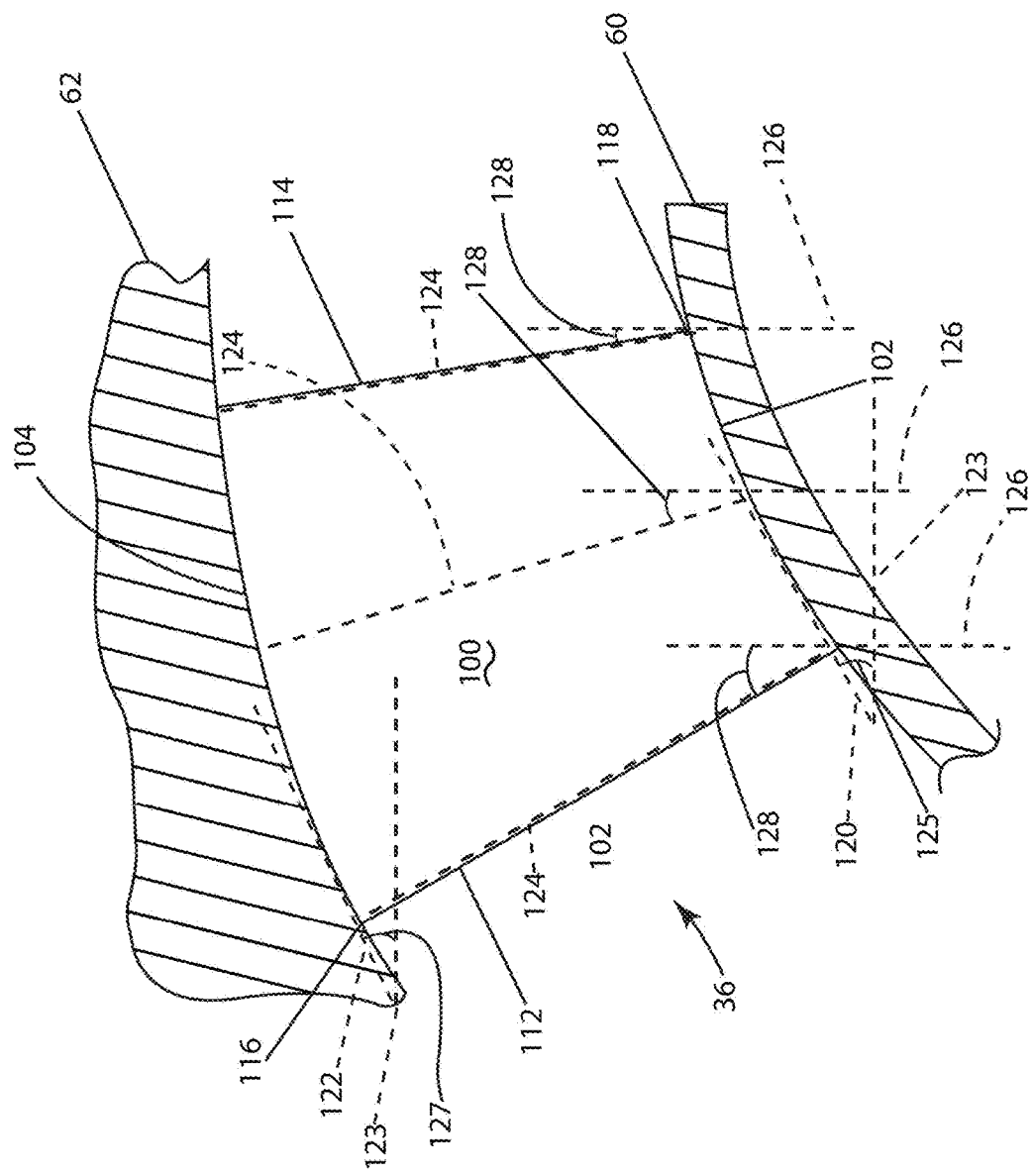
FIG. 5 is a 2-D axial projection of the of the vane of FIG. 4, further illustrating a first acute angle, in accordance with various aspects described herein.

As is best seen in FIG. 5, which is an 2-D axial projection of a vane 100 of the set of vanes 100 of FIG. 4, the flow path 36 is defined by a curve that extends between, at least, an upstream point 116 defined as the farthest upstream portion of the vane 100 and a downstream point 118 defined as the farthest downstream portion of the vane 100. Specifically, the upstream point 116 can be the point where the leading edge 112 meet the outer periphery 72 at the tip 104, while the downstream point 118 can be the point where the trailing edge 114 meets the inner periphery 70 at the root 102. The curve of the flow path 36, when viewed axially and in a 2-D plane as shown in FIG. 5, can be quantified by measuring an angle between a first local tangent line 120 of the inner periphery 70 and a second local tangent line 122 of the outer periphery 72 with respect to the rotational axis 54 (schematically illustrated as a corresponding projection 123 intersecting the first local tangent line 120 and the second local tangent line 122). Although the first local tangent line 120 and the second local tangent line 122 are illustrated, it will be appreciated that the any portion of the inner periphery 70 and the outer periphery 72 axially between the upstream point 116 and the downstream point 118 can include the first local tangent line 120 and the second local tangent line 122, respectively.

It is contemplated that the first local tangent line 120 can be defined by a first angle 125 that is angled between 0 and 25 degrees with respect to the projection 123 of the rotational axis 54, while the second local tangent line 122 can be defined by a second angle 127 that is angled between 0 and 15 degrees with respect to the projection 123 of the rotational axis 54. Both the first angle 125 and the second angle 127 can be acute angles. As such, it will be appreciated that either of the inner periphery 70 or the outer periphery 72 can extend at an acute angle with respect to the rotational axis 54. It will be appreciated that at least one of the first angle 125 defined by the first local tangent line 120, or the second angle 127 defined by the second local tangent line 122 can be non-constant between the upstream point 116 and the downstream point 118 of the vane 100. Additionally, or alternatively, at least one of the first local tangent line 120 or the second local tangent line 122 can be constant, or otherwise equal to or unequal to one another between the upstream point 116 and the downstream point 118.

As illustrated, the vane 100 can follow a surface contour of the inner periphery 70 and the outer periphery 72 the flow path 36. In other words, the root 102 can follow the surface contour of the inner periphery 70, while the tip 104 can follow the surface contour of the outer periphery 72 and the vane 100 can extend between the two. As such, the vane 100 can be tilted in an axial direction with respect to the rotational axis 54 or otherwise be defined as a shaped vane that is axially tilted.

To further illustrate the vane 100 being axially tilted, a set of lines 124 extending in the span-wise direction between the root 102 and the tip 104 can be drawn. The lines 124 can be defined as a line extending from the root 102 to the tip 104 that intersects the root 102 and the tip 104 at a same percentage of the chord between the leading edge 112 and the trailing edge. For example, three lines 124 have been drawn, one extending along the leading edge 112, one extending along the trailing edge 114, and one extending through the middle of the vane 100 (e.g., from 50% of the root 102 in the chord-wise direction to 50% of the tip in the chord-wise direction). A set of rays 126, extending normal to the rotational axis 54, can intersect the set of lines 124 along the span-wise extent of the set of lines 124. For example, as illustrated, each ray 126 intersects a corresponding line 124 at the root 102. However, it will be appreciated that the ray 126 can intersect a corresponding line 124 along any portion of the line 124 from the root 102 to the tip 104. For illustration purposes, the set of rays 126 have been drawn to extend beyond a point of intersection between the rays 126 and the corresponding set of lines 124. When viewed in a plane including the set of lines 124 and the rotational axis 54, an axial angle, specifically an acute axial angle 128, can be formed between the set of lines 124 and the corresponding set of rays 126. The acute axial angle 128 can be between 3 and 5 degrees.

It will be appreciated that the set of lines 124 can extend linearly in the span-wise direction from the root 102 to the tip 104 such that the acute axial angle 128 is constant from the root 102 to the tip 104 along a corresponding line 124. Additionally, or alternatively, the set of lines 124 can extend non-linearly or non-constantly in the span-wise direction such that the acute axial angle 128 is non-constant from the root 102 to the tip 104. For example, the acute axial angle 128 where the root 102 and the leading edge 112 intersect can be a first angle, while the acute axial angle 128 where the tip 104 and the leading edge 112 intersect can be up to 66% greater than or less than the first angle. It will be yet further appreciated that the acute axial angle 128 can be non-constant between the set of line 124. In other words, the acute axial angle 128 can vary in the chord-wise direction. For example, the acute axial angle 128 where the root 102 intersects the trailing edge 114 (e.g., the downstream point 118) can be 3 degrees, while the acute axial angle 128 where the root 102 intersects the leading edge 112 can be 5 degrees. Additionally, or alternatively, these angles can be equal.

As discussed herein, the vane 100 as illustrated can be included within the set of vanes 100 circumferentially spaced about the rotational axis 54. It will be appreciated that each vane 100 of the set of vanes 100 can include the same acute axial angle 128 through the entirety of the vane 100. In other words, each vane 100 in the set of vanes 100 can be identical. Additionally, or alternatively, one or more vanes 100 of the set of vanes 100 can include differing acute axial angles 128. For example, one vane 100 can include an axial angle of 3 degrees over the entirety of the vane 100, while the remaining vanes 100 can include an axial angle of 5 degrees of the entirety of the vanes 100.

Figure 6:
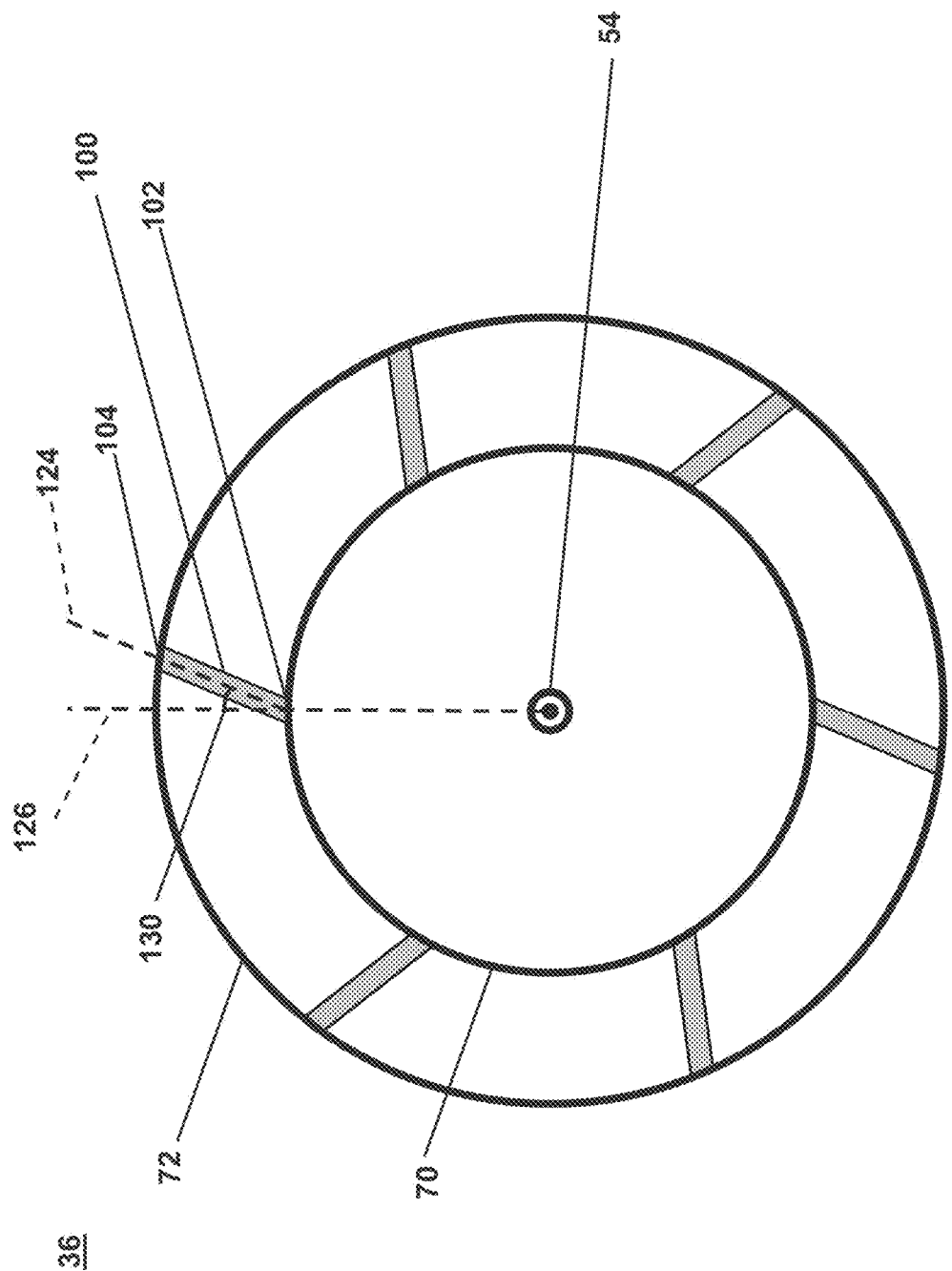
FIG. 6 is a schematic, cross-sectional view of the flow path as seen from section VI-VI of FIG. 3, further illustrating the set of vanes including a second acute angle, in accordance with various aspects described herein.

FIG. 6 is a cross-sectional view of the flow path 36 as seen from section VI-VI of FIG. 3, further illustrating the set of vanes 100, which are circumferentially spaced about the rotational axis 54, viewed in a plane perpendicular to the rotational axis 54. Although only six, uniformly spaced vanes 100 are illustrated, it will be appreciated that there can be any number of one or more vanes 100 can be uniformly or non-uniformly, circumferentially spaced space about the rotational axis 54.

As illustrated, a line 124 of the set of lines 124 is drawn through the middle of one of the vanes 100 of the set of vanes 100. When viewed in this illustration, or when viewed in a plane perpendicular to the rotational axis 54, an acute tangential angle 130 can be formed between the line 124 and a corresponding ray 126 of the set of rays 126 extending perpendicularly to the rotational axis 54. The acute tangential angle 130 can be between 1.5 and 5 degrees. As discussed herein, the line 124 can extend linearly from the root 102 to the tip 104 of the vane 100, however, it will be appreciated that at least a portion of the line 124 can be non-linear or non-constant such that the acute tangential angle 130 can vary in the span-wise direction from root 102 to tip 104. Additionally, or alternatively, the acute tangential angle 130 can vary in the chord-wise direction such that the acute tangential angle 130 can vary along the chord-wise extent of the vane 100. It will be yet further appreciated that the vane 100 can be tangentially leaned toward either the suction side 110 or pressure side 108 of the vane 100. In other words, the acute tangential angle 130 of the set of vanes 100 can between 1.5 and 5 degrees, or −1.5 and −5 degrees.

Each vane 100 of the set of vanes 100 can be linearly extending (e.g., the set of lines 124 are linear from the root 102 to the tip 104), and tangentially leaned in the same direction, however, it will be appreciated that the acute tangential angle 130 of each vane 100 of the set of vanes 100 does not need to be the same between each vane 100. In other words, one or more vanes 100 can be tangentially leaned in one direction while the other vanes 100 can be leaned in the opposite direction. Additionally, or alternatively, at least one vane 100 can be defined by a non-linear or non-constant line 124 such that the acute tangential angle 130 varies from root 102 to tip 104, or from leading edge 112 to trailing edge 114 while another vane 100 can be defined by a linear line 124 such that the acute tangential angle 130 is constant along the entirety of the vane 100.

Figure 7:
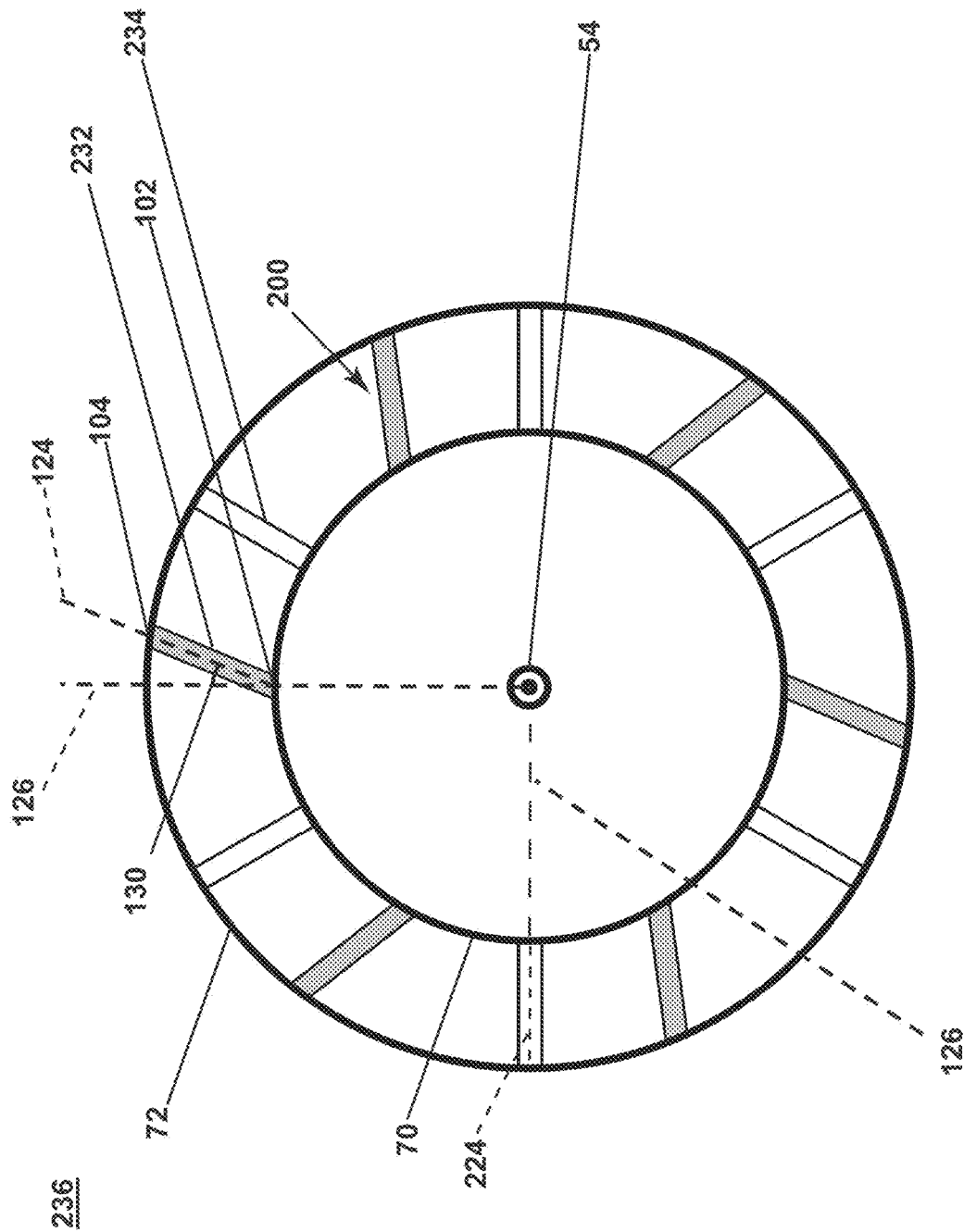
FIG. 7 is a schematic, cross-sectional view of an exemplary flow path as seen from section VI-VI of FIG. 3, further illustrating a first group of vanes and a second group of vanes, in accordance with various aspects described herein.

FIG. 7 is a cross-sectional view of an exemplary flow path 236 as seen from section VI-VI of FIG. 3. The exemplary flow path 236 is similar to the flow path 36; therefore, like parts will be identified with like numerals in the 200 series, with it being understood that the description of the like parts of the flow path 36 applies to the exemplary flow path 236 unless otherwise noted. The flow path 236 is similar to the flow path 36, however, the flow path 236 includes a set of vanes 200 including a first group of vanes 232 and a second group of vanes 234, with the first group of vanes 232 and the second group of vanes 234 being alternately, circumrenal spaced about the rotational axis 54.

The first group of vanes 232 can be similar to the set of vanes 100 in that they include the set of lines 124 that are tangentially leaned with respect to the set of rays 126 normal to the rotational axis 54. In other words, the first group of vanes include the acute tangential angle 130 defining a tangential lean of the vanes 232 of the first group of vanes 232. The second group of vanes 332, however, can be defined by a set of lines 224 that extend parallel to the set of rays 126. As such, the second group of vanes 234 can extend parallel to the set of rays 126, be normal to the rotational axis 54, or otherwise not be tangentially leaned. In other words, the acute tangential angle 130 of the second group of vanes 234 can be zero with respect to the set of rays 126. As such, the set of vanes 200 can include the first group of vanes 232 having the acute tangential angle 130 that is non-zero, specifically between either 1.5 degrees and 3 degrees or −1.5 degrees and −3 degrees, and the second group of vanes 234 having the acute tangential angle 130 that is zero.

It is contemplated that the alternate spacing of the first group of vanes 234 and the second group of vanes 234 can be used to change the frequency that the pressurized air is impacting various portions of the blades 53 that are downstream the set of vanes 200. During operation of the air turbine starter 10, the pressurized air can flow from the leading edge 112 to the trailing edge 114 of the set of vanes 200 and follow the contour of the vanes 200. The pressurized air the flows over the vanes 200 can be defined as a stator wake downstream the vanes 200. It is contemplated that the acute axial angles 128 along with the acute tangential angles 130, or the lack of the acute tangential angles 130 (e.g., the second group of vanes 234) can result in the pressurized air leaving the vanes 200 at differing angles. As such, the pressurized air leaving the first group of vanes 234, or the stator wake from the first group of vanes 234, can impinge a different portion of the blades 53 than the stator wake of the second group of vanes 234. The difference in what part of the blade that the stator wakes impinge can be used to ensure the blades 53 have a controlled loading as they rotate about the rotational axis 54. As used herein, the term "controlled loading" can refer to the ability to manage or direct the stator wake to impinge against desired portions of the blade. For example, the controlled loading can be used to ensure that as the blade rotates about the rotational axis 54 that each portion of the blade is equally loaded. The controlled loading of the blades 53 can, in turn, ensure that a load distribution over the blade is tuned to extend the lifespan of the blades 53 by minimizing instantaneous forces on the blades as they pass through the stator wakes, when compared to a conventional air turbine starter that does not include the vanes 100, 200, as described herein. It is contemplated that the number and spacing the vanes 200 can be used to change the frequency at which the pressurized air impinges the blades 53 at a desired angle (e.g., the angle the pressurized air is at when it leaves the set of vanes 200 at the trailing edge 114). For example, a larger amount of vanes 200 will result in a higher frequency that the pressurized airflow, which has been redirected by the set of vanes 200, will impinge against the blades 53.

Figure 8:
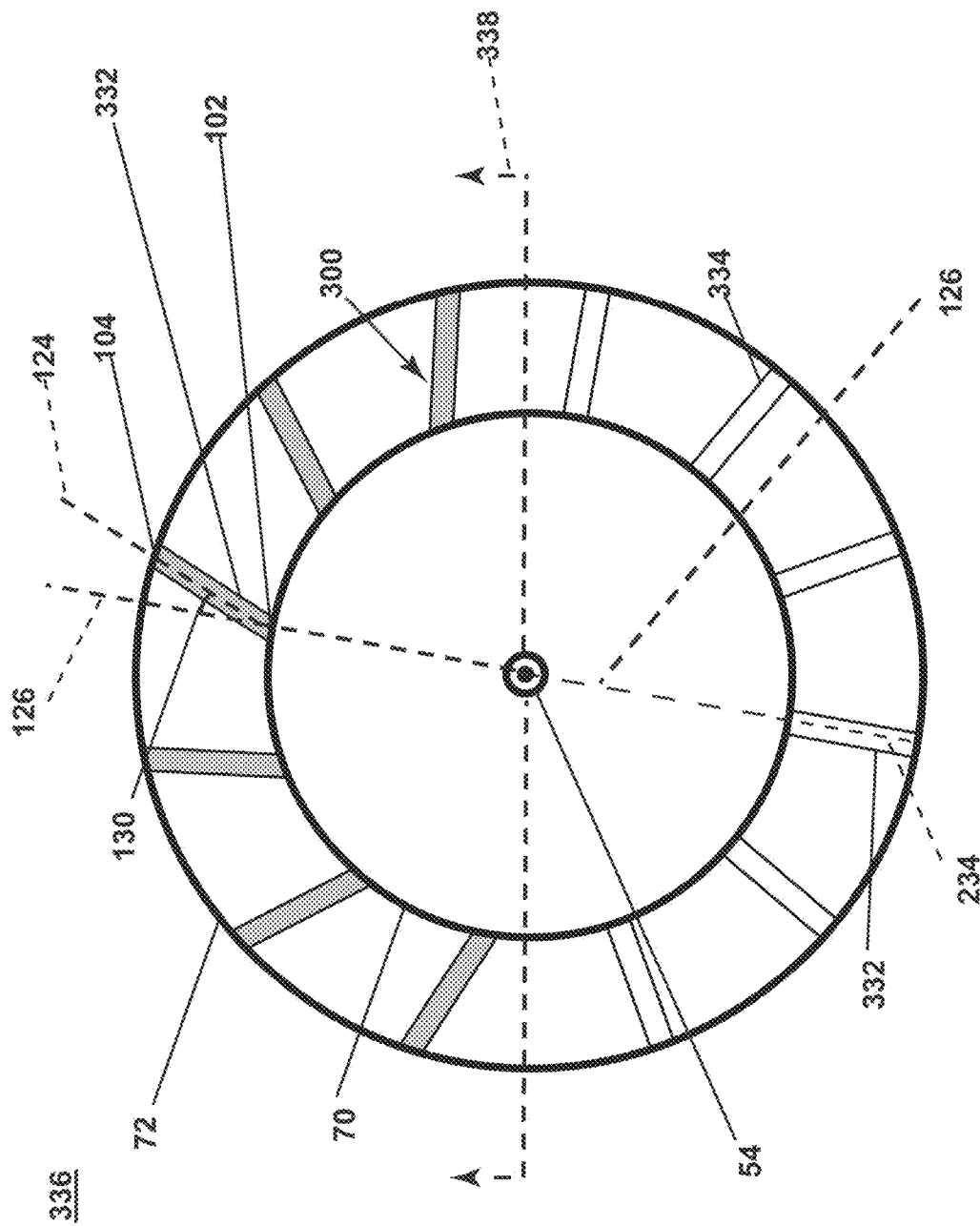
FIG. 8 is a schematic, cross-sectional view of an exemplary flow path as seen from section VI-VI of FIG. 3, further illustrating an exemplary first group of vanes and an exemplary second group of vanes, in accordance with various aspects described herein.

FIG. 8 is a cross-sectional view of an exemplary flow path 336 as seen from section VI-VI of FIG. 3. The exemplary flow path 336 is similar to the flow path 36, 236; therefore, like parts will be identified with like numerals in the 300 series, with it being understood that the description of the like parts of the flow path 36, 236 applies to the exemplary flow path 336 unless otherwise noted.

The flow path 336 can include a first group of vanes 332 and a second group of vanes 334 non-alternately, circumferentially spaced about the rotational axis 54. Specifically, the first group of vanes 332 are located within a first half of the flow path 336 (illustrated through sectional line 338) while the second group of vanes 334 are located within a second half of the flow path 336 opposite the first half. It is contemplated that there can be the same number of vanes 300 in the first group of vanes 334 as the second group of vanes 334. In other words, there can be a 1:1 ratio of vanes 300 in the first group of vanes 334 to vanes 300 in the second group of vanes 334. It will be appreciated, however, that there can be any suitable ratio of vanes 300 between the first group of vanes 334 and the second group of vanes 334. For example, there can be a 1:2 ratio of the first group of vanes 334 to the second group of vanes 334 (e.g., double the amount of vanes 300 in the second group of vanes 334 than the first group of vanes 334). In such a case, the vanes 300 in the first group of vanes 334 can still be in the first half while the vanes 300 in the second group of vanes 334 can still be in the second half. As such, there will double the amount of vanes 300 in the second half than the first half. Additionally, or alternatively, the vanes 300 can be evenly spaced such that instead the vanes 300 being spaced in a first half and a second half, the vanes 300 can instead be spaced in a first third and a second two-thirds. In other words, the first group of vanes 334 can span across a third of the flow path 336, while the second group of vanes 334 can span across the remaining two-thirds of the flow path 336. It will be appreciated that this is a non-limiting example and that there can be any number of vanes 300 in the first group of vanes 334 or the second group of vanes 334 located along any portion of the flow path 336.

Similar to the set of vanes 200, the set of vanes 300 can include the first group of vanes 334 and the second group of vanes 334 spaced along differing portions of the flow path 336 to ensure that the pressurized air leaving the vanes 300 impinges the blades 53 at differing locations to create the uniform loading over the blades 53. When compared to the spacing of the vanes 300 to the vanes 200, the frequency at which the pressurized air impinges the blades 53 at differing angle can be reduced. This is because the region of the flow path 336 including the first group of vanes 334 can be further defined as a region of the flow path 336 where the pressurized air is angled by the first group of vanes 334 (e.g., vanes 300 defined by the acute axial angle 128 and tangentially leaned), while the region of the flow path 336 including the second group of vanes 334 can be further defined as a region of the flow path 336 where the pressurized air is angled by the second group of vanes 334 (e.g., vanes 300 defined by the acute axial angle 128 and not tangentially leaned). As such, the blades 53 will be impinged by a pressurized air of a first angle when the blades 53 cross the region of the flow path 336 including the first group of vanes 334, and a second angle, different from the first angle, when the blades 53 cross the region of the flow path 336 including the second group of vanes 334.

Figure 9:
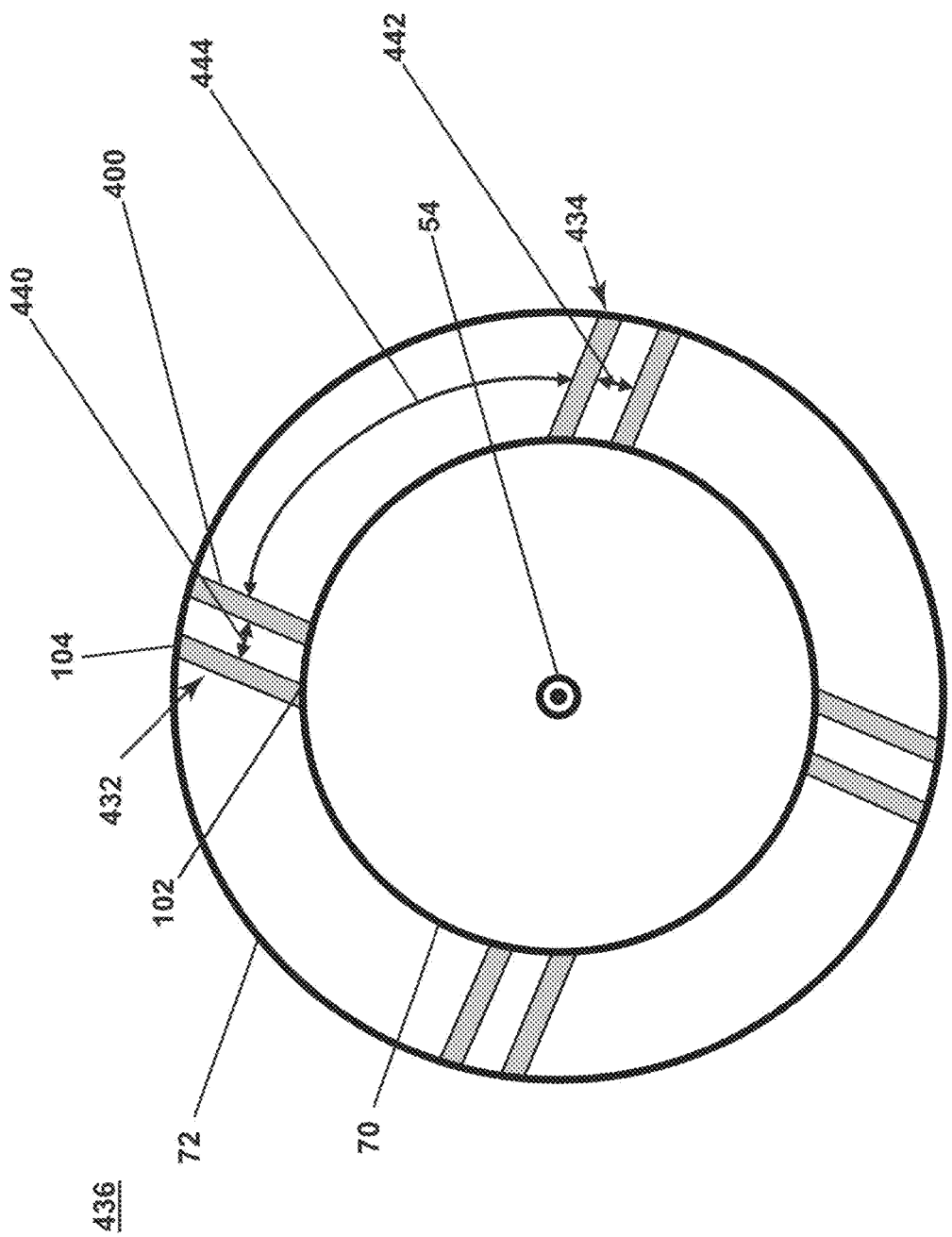
FIG. 9 is a schematic, cross-sectional view of an exemplary flow path as seen from section VI-VI of FIG. 3, further illustrating an exemplary set of vanes, in accordance with various aspects described herein.

FIG. 9 is a cross-sectional view of an exemplary flow path 436 as seen from section VI-VI of FIG. 3. The exemplary flow path 436 is similar to the flow path 36, 236, 336; therefore, like parts will be identified with like numerals in the 400 series, with it being understood that the description of the like parts of the flow path 36, 236, 336 applies to the exemplary flow path 436 unless otherwise noted. The flow path 436 can include a set of vanes 400 similar to the set of vanes 100, 200, 300, except the set of vanes 400 are non-uniformly spaced about the rotational axis 54.

The set of vanes 400 including a first group of vanes 432 and a second group of vanes 434. Both the first group of vanes 432 and the second group of vanes 434 can include a pair of vanes 400. Although two vanes are illustrated, it will be appreciated that there can be any number of two or more adjacent vanes 400 in the first group of vanes 432 and the second group of vanes 434. The vanes 400 in the first group of vanes 432 and the second group of vanes 434 can each be positioned a first distance 440 and a second distance 442, respectively, from one another. Specifically, the vanes 400 in the first group of vanes 432 and the second group of vanes 434 can be spaced between 1 and 5 degrees from each other. It will be appreciated that the first distance 440 and the second distance 442 can be equal or non-equal. The first group of vanes 432 of vanes and the second group of vanes 434 can be positioned a third distance 444 from each other, with the third distance 444 being larger than the first distance 440 and the second distance 442. As a non-limiting example, the third distance 444 can be up to two times larger than either the first distance 440 or the second distance 442. In other words, there can be up to a 2:1 ratio between the third distance 444 and the first distance 440 or the second distance 442.

The first group of vanes 432 and the second groups of vanes 434 can be similar to the first group of vanes 234, 334 and the set of vanes 100 in that they are tangentially leaned. However, it will be appreciated that either of the first group of vanes 432 or the second group of vanes 434 can include vanes similar to the second group of vanes 234, 334. Additionally, or alternatively, it is contemplated that the vanes 400 within the first group of vanes 432 and the second group of vanes 434 can differ from one another. For example, one vane 400 in a pair of adjacent vanes 400 in the first group of vanes 432 can be tangentially leaned, while the other vane 400 can be non-tangentially leaned.

Benefits of the present disclosure include a set of vanes that reduce the aero-mechanical effect of the pressurized air, or the stator wake, on the blades of air turbine starter when compared to conventional air turbine starters. For example, conventional air turbine starters can include a set of vanes not defined by the acute axial angles, the acute tangential angles, or are uniformly spaced about the rotational axis. As such, the pressurized air leaving the vanes, or the stator wake, will impinge the blades at the same chord-wise location along the blades the entire time it rotates about the rotational axis. This, in turn, creates a larger loading on a single portion of the blades, thus increasing the aero-mechanical effect that the pressurized air leaving the vanes has on the blades downstream the vanes. As used herein, the term "aero-mechanical effect" can refer to a fatigue load or a stress the pressurized air, specifically the stator wake, apply to the blades of the air turbine starter. In terms of the conventional air turbine starter, the aero-mechanical effect of the pressurized air, and more specifically the stator wake, can be that a single portion of the blades are constantly loaded when compared to other portions of the blades. The air turbine starter, as described herein, includes a set of vanes that can include the acute axial angles, the acute tangential angles, and the non-uniform spacing, all of which can greatly reduce the aero-mechanical effect that the pressurized air or the stator wake has on the blades. This is because the set of vanes can be angled, spaced, and varied (e.g., the set of vanes including the first group of vanes and the second group of vanes) such that the controlled loading ensures that the blades experience better distributed loading as they rotate about the rotational axis and pass each vane. In other words, the blades are not loaded at the same chord-wise location the entire time they rotate about the rotational axis). This, in turn, results in the aero-mechanical effect of the pressurized air impinging the blades to be much lower when compared to the aero-mechanical effect of the pressurized air impinging the blades in the conventional air turbine starter as the blades are being uniformly loaded. Further, the controllable loading, or the distributed loading, can reduce a rotor or tip deflection of the blades by upwards of 40% when compared to conventional air turbine starters, thus reducing the aero-mechanical effects. As used herein, the term "rotor deflection" or "tip deflection" can be defined as a measure of the stress a blade experiences during its operation as the tip of the blade deflects in a surface normal direction. These reductions in the aero-mechanical effects can result in a reduced need for maintenance as the fatigue loads or stressed generated by the pressurized air have been decreased when compared to the conventional air turbine starter, thus increasing a fatigue life of the blades through the controlled loading of the blades by the shaped vanes. Further yet, the controlled loading, or the distributed loading, on the blades can yield a design freedom of the blades in order to improve the aerodynamic performance of the blades without over-stressing the blades. This, in turn, improves the efficiency of the air turbine starter.

Further benefits of the present disclosure include a smaller air turbine starter with the same rotational output of the drive shaft when compared to conventional air turbine starters. For example, conventional air turbine starters rely on the set of vanes being located within a non-curved section of the flow path. The set of vanes are located within the non-curved sections as there are significant design hurdles when designing the set of vanes to ensure that the pressurized air, which flows over the vanes, is turned or directed in both the desired tangential and radial directions. Locating the vanes within a portion of the flow path that is curved would introduce another layer of complexity in the design of the blades to ensure that the pressurized air is directed in the desired directions. As such, the flow path must first level off or otherwise become a straight flow path before the section of the flow path including the set of vanes. This, in turn, increases the axial extent of the flow path. The air turbine starter as described herein, however, can include the set of vanes located within a curved section of the flow path. As such, the flow path does not need to level off before the section where the vanes are located. This, in turn, reduces the axial extent of the flow path when compared to conventional air turbine starters. Further yet, as discussed in the previous section, the controlled loading, or the distributed loading, can yield a design freedom for the blades. This, in turn, can allow for more efficient design of the blades without worry of the blades experiencing large amounts of aero-mechanical stress. This is all done without sacrificing the rotational output of the blades. As such, the vanes, as described herein, can ultimately result in a more modular design for the air turbine starter without sacrificing the rotational output of the drive shaft when compared to conventional air turbine starters.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

An air turbine starter, comprising a housing defining an inlet, an outlet, and a flow path extending between the inlet and the outlet, a turbine having a rotor with circumferentially spaced blades located within the housing, at least a portion of the blades extend into the flow path and rotate in a rotational direction in response to a fluid flowing along the flow path from the inlet to the outlet, a drive shaft operably coupled to and rotating with the rotor to define a rotational axis, and at least one vane located within the flow path, upstream of the blades, and having an outer wall defining a pressure side and a suction side extending between a leading edge and a trailing edge to define a chord-wise direction, and between a root and a tip to define a span-wise direction, wherein the at least one vane is shaped such that a line, extending between the root and the tip at the same percent of the at least one vane in the chord-wise direction, forms an acute axial angle relative to a ray extending perpendicularly from the rotational axis and intersecting the line when viewed in a plane including the line and the rotational axis, and wherein the at least one vane is further shaped such that an acute tangential angle is formed between the line and the ray extending perpendicularly from the rotational axis when viewed in a plane that is normal to the rotational axis.

The air turbine starter of any preceding clause, wherein the acute axial angle is between 3 and 5 degrees.

The air turbine starter of any preceding clause, wherein the acute tangential angle is between −1.5 and −5.0 degrees or 1.5 and 5.0 degrees.

The air turbine starter of any preceding clause, wherein the acute axial angle where the root intersects the trailing edge is 3 degrees.

The air turbine starter of any preceding clause, wherein the acute axial angle where the root intersects the leading edge is non-equal to the acute axial angle where the root intersects the trailing edge.

The air turbine starter of any preceding clause, wherein the acute axial angle is non-constant in the span-wise direction or chord-wise direction.

The air turbine starter of any preceding clause, wherein the tangential angle is non-constant in the span-wise direction or chord-wise direction.

The air turbine starter of any preceding clause, wherein an upstream point along the tip at the leading edge defines a farthest upstream portion of the at least one vane, and a downstream point along the root at the trailing edge defines a farthest downstream portion of the at least one vane.

The air turbine starter of any preceding clause, wherein the flow path comprises an inner periphery, and an outer periphery located radially outwardly from the inner periphery with respect to the rotational axis, wherein at least a portion of the flow path that is axially between the upstream point and the downstream point of the at least one vane defines a curved flow path such that the inner periphery or the outer periphery extends at an acute angle with respect to the rotational axis.

The air turbine starter of any preceding clause, wherein the inner periphery within the curved flow path is defined by a first local tangent line along any portion of the inner periphery, and the outer periphery within the curved flow path is defined by a second local tangent line along any portion of the outer periphery.

The air turbine starter of any preceding clause, wherein a first angle is formed between the first local tangent line and the rotational axis, and a second angle is formed between the second local tangent line and the rotational axis, wherein the first angle is between 0 and 25 degrees, and the second angle is between 0 and 15 degrees.

The air turbine starter of any preceding clause, wherein at least one of the first local tangent line or the second local tangent line is non-constant between the upstream point and the downstream point of the at least one vane.

The air turbine starter of any preceding clause, wherein the at least one vane is included within a set of vanes circumferentially spaced about the rotational axis.

The air turbine starter of any preceding clause, wherein the set of vanes includes a first group of vanes and a second group of vanes, with the acute tangential angle of the first group of vanes being non-zero, and the acute tangential angle of the second group of vanes being zero.

The air turbine starter of any preceding clause, wherein the first group of vanes and the second group of vanes are non-alternately spaced about the rotational axis.

The air turbine starter of any preceding clause, wherein the first group of vanes is located within a first half of the set of vanes, and the second group of vanes is located within second half of the set of vanes, with the first half being opposite the second half.

The air turbine starter of any preceding clause, wherein the set of vanes includes a first group of vanes and a second group of vanes, wherein the first group of vanes includes at least two vanes adjacent to and spaced a first distance from each other, and the second group of vanes includes at least two vanes adjacent to and spaced a second distance from each other, with the first group of vanes and the second group of vanes being spaced a third distance from each other.

The air turbine starter of any preceding clause, wherein the first distance and the second distance are each smaller than the third distance.

A vane located within a flow path of an air turbine starter that includes a drive shaft defining a rotational axis, the vane comprising an outer wall defining a pressure side and a suction side extending between a leading edge and a trailing edge to define a chord-wise direction, and between a root and a tip to define a span-wise direction, wherein the vane is shaped such that a line, intersecting the root and the tip at the same percent of the vane in the chord-wise direction, forms an acute axial angle relative to a ray extending perpendicularly from the rotational axis and intersecting the line when viewed in a plane including the line and the rotational axis, and wherein the vane is further shaped such that an acute tangential angle is formed between the line and the ray extending perpendicularly from the rotational axis when viewed in a plane that is normal to the rotational axis.

The vane of any preceding clause, wherein the acute axial angle is between 3 and 5 degrees, and wherein the acute tangential angle is between −1.5 and −5.0 degrees or 1.5 and 5.0 degrees.

What is claimed is:

1. An air turbine starter, comprising:
    a housing defining an inlet, an outlet, and a flow path extending between the inlet and the outlet;
    a turbine having a rotor with circumferentially spaced blades located within the housing, at least a portion of the circumferentially spaced blades extend into the flow path and rotate in a rotational direction in response to a fluid flowing along the flow path from the inlet to the outlet;
    a drive shaft operably coupled to and rotating with the rotor to define a rotational axis; and
    set of vanes located within the flow path, upstream of the circumferentially spaced blades, the set of vanes being circumferentially spaced about the rotational axis, with each vane of the set of vanes having an outer wall defining a pressure side and a suction side extending between a leading edge and a trailing edge to define a chord-wise direction, and between a root and a tip to define a span-wise direction;

wherein each vane of the set of vanes is shaped such that a line, extending between the root and the tip at the same percent of the vane in the chord-wise direction, forms an acute axial angle relative to a ray extending perpendicularly from the rotational axis and intersecting the line when viewed in a plane including the line and the rotational axis, and an acute tangential angle is formed between the line and the ray extending perpendicularly from the rotational axis when viewed in a plane that is normal to the rotational axis; and wherein the set of vanes includes a first vane and a second vane, with the acute tangential angle of the first vane being non-zero and the acute tangential angle of the second vane being zero.

2. The air turbine starter of claim 1, wherein the acute axial angle is between 3 and 5 degrees.

3. The air turbine starter of claim 1, wherein the acute tangential angle is between −1.5 and −5.0 degrees or 1.5 and 5.0 degrees.

4. The air turbine starter of claim 1, wherein the acute axial angle where the root intersects the trailing edge is 3 degrees.

5. The air turbine starter of claim 4, wherein the acute axial angle where the root intersects the leading edge is non-equal to the acute axial angle where the root intersects the trailing edge.

6. The air turbine starter of claim 1, wherein the acute axial angle is non-constant in the span-wise direction or chord-wise direction.

7. The air turbine starter of claim 1, wherein the acute tangential angle is non-constant in the span-wise direction or chord-wise direction.

8. The air turbine starter of claim 1, wherein an upstream point along the tip at the leading edge defines a farthest upstream portion of each vane of the set of vanes, and a downstream point along the root at the trailing edge defines a farthest downstream portion of each vane of the set of vanes.

9. The air turbine starter of claim 8, wherein the flow path comprises:
an inner periphery; and
an outer periphery located radially outwardly from the inner periphery with respect to the rotational axis;
wherein at least a portion of the flow path that is axially between the upstream point and the downstream point of each vane of the set of vanes defines a curved flow path such that the inner periphery or the outer periphery extends at an acute angle with respect to the rotational axis.

10. The air turbine starter of claim 9, wherein the inner periphery within the curved flow path is defined by a first local tangent line along any portion of the inner periphery, and the outer periphery within the curved flow path is defined by a second local tangent line along any portion of the outer periphery.

11. The air turbine starter of claim 10, wherein a first angle is formed between the first local tangent line and the rotational axis, and a second angle is formed between the second local tangent line and the rotational axis, wherein the first angle is between 0 and 25 degrees, and the second angle is between 0 and 15 degrees.

12. The air turbine starter of claim 10, wherein at least one of the first local tangent line or the second local tangent line is non-constant between the upstream point and the downstream point of each vane of the set of vanes.

13. The air turbine starter of claim 1, wherein the set of vanes includes a first group of vanes including the first vane and a second group of vanes including the second vane, with the acute tangential angle of each vane of the first group of vanes being non-zero, and the acute tangential angle of each vane of the second group of vanes being zero.

14. The air turbine starter of claim 13, wherein the first group of vanes and the second group of vanes are non-alternately spaced about the rotational axis.

15. The air turbine starter of claim 14, wherein the first group of vanes is located within a first half of the set of vanes, and the second group of vanes is located within second half of the set of vanes, with the first half being opposite the second half.

16. The air turbine starter of claim 1, wherein the set of vanes includes a first group of vanes and a second group of vanes, wherein the first group of vanes includes at least two vanes adjacent to and spaced a first distance from each other, and the second group of vanes includes at least two vanes adjacent to and spaced a second distance from each other, with the first group of vanes and the second group of vanes being spaced a third distance from each other.

17. The air turbine starter of claim 16, wherein the first distance and the second distance are each smaller than the third distance.

18. At least two vanes including a first vane and a second vane located within a flow path of an air turbine starter that includes a drive shaft defining a rotational axis, each vane of the at least two vanes comprising:
an outer wall defining a pressure side and a suction side extending between a leading edge and a trailing edge to define a chord-wise direction, and between a root and a tip to define a span-wise direction;
wherein the first vane and the second vane shaped such that a line, intersecting the root and the tip at the same percent of each vane in the chord-wise direction, forms an acute axial angle relative to a ray extending perpendicularly from the rotational axis and intersecting the line when viewed in a plane including the line and the rotational axis, and
an acute tangential angle is formed between the line and the ray extending perpendicularly from the rotational axis when viewed in a plane that is normal to the rotational axis; and
wherein the acute tangential angle of the first vane is non-zero and the acute tangential angle of the second vane is zero.

19. The at least two vanes of claim 18, wherein the acute axial angle is between 3 and 5 degrees.

20. The at least two vanes of claim 18, wherein the acute tangential angle is between −1.5 and −5.0 degrees or 1.5 and 5.0 degrees.

* * * * *